US005411003A

United States Patent [19]

Eberhard et al.

[11] Patent Number: 5,411,003

[45] Date of Patent: May 2, 1995

[54] VISCOSITY SENSITIVE AUXILIARY CIRCUIT FOR HYDROMECHANICAL CONTROL VALVE FOR TIMING CONTROL OF TAPPET SYSTEM

[75] Inventors: Walter W. Eberhard, Columbus, Ind.; John J. McCosby, Jamestown, N.Y.; Paul D. Free, Columbus, Ind.; Jerome M. Long, Northeast, Pa.; David A. Olson, Columbus, Ind.

[73] Assignee: Cummins Engine Company, Inc., Columbus, Ind.

[21] Appl. No.: 222,883

[22] Filed: Apr. 5, 1994

[51] Int. Cl.[6] .................. F02M 37/04; F16K 15/00

[52] U.S. Cl. .................. 123/502; 123/381; 137/467.5

[58] Field of Search .................. 123/501, 502, 381; 137/467.5, 115

[56] References Cited

U.S. PATENT DOCUMENTS

| | | | |
|---|---|---|---|
| 1,863,090 | 6/1932 | Albersheim et al. . | |
| 2,035,951 | 3/1936 | Eckstein . | |
| 2,050,242 | 8/1936 | Booth . | |
| 2,051,026 | 8/1936 | Booth . | |
| 2,194,605 | 3/1940 | Mapel . | |
| 3,170,503 | 2/1965 | Isley et al. | 123/381 |
| 3,204,623 | 9/1965 | Isley et al. | 123/381 |
| 3,402,733 | 9/1968 | McAlvay | 137/467.5 |
| 3,938,369 | 2/1976 | de Bok . | |
| 4,249,499 | 2/1981 | Perr | 123/502 |
| 4,306,528 | 12/1981 | Straubel et al. | 123/502 |
| 4,419,977 | 12/1983 | Hillebrand | 123/502 |
| 4,493,302 | 1/1985 | Kawamura | 123/357 |
| 4,889,092 | 12/1989 | Bostwick | 123/381 |
| 5,024,200 | 6/1991 | Free et al. | 123/501 |
| 5,085,198 | 2/1992 | Barlett et al. | 123/381 |
| 5,181,494 | 1/1993 | Ausman et al. | 123/446 |
| 5,357,912 | 10/1994 | Barnes et al. | 123/381 |

*Primary Examiner*—Henry C. Yuen
*Assistant Examiner*—Thomas N. Moulis
*Attorney, Agent, or Firm*—Woodard, Emhardt, Naughton, Moriarty & McNett

[57] ABSTRACT

A viscosity sensitive, pressure divider arrangement for use as part of an engine timing control tappet system where that system includes a block oil pressure supply, hydromechanical control valve and an oil sump, the pressure divider arrangement including an inlet chamber, a divider chamber and an exit chamber. The inlet chamber is connected to the divider chamber by means of a first connecting conduit having a relatively short length. The outlet side of the divider chamber is connected with the exit chamber by means of a second connecting conduit which has a length substantially longer than the length of the first connecting conduit. Additionally, the divider chamber includes a pressure-assist outlet aperture which is in flow communication with the hydromechanical control valve. The viscosity of oil flowing into the pressure divider arrangement will be acted upon by the combination of connecting conduits wherein the first connecting conduit is less viscosity sensitive than is the second connecting conduit. Consequently, a controlling pressure will be created within the divider chamber and this controlling (assist) pressure is communicated to the hydromechanical control valve and influences the switch point of that control valve.

16 Claims, 9 Drawing Sheets

VISCOSITY SENSITIVE AUXILIARY CIRCUIT FOR HYDROMECHANICAL CONTROL VALVE FOR TIMING CONTROL OF TAPPET SYSTEM

BACKGROUND OF THE INVENTION

The present invention relates in general to the timing control of fuel injection in a diesel engine using engine lubrication oil. More particularly the present invention relates to the use of a hydromechanical control valve in combination with a pressure divider as part of a viscosity sensitive auxiliary circuit to provide favorable (improved) performance of an advanced fuel injection timing system.

It has long been known to use engine lubrication oil to advance or retard the timing of fuel injection in a diesel engine. Although normal timing is ideal for a range of engine connected operating conditions, it results in incomplete combustion during idle and low engine speeds because of insufficient pressure in the combustion chamber. Incomplete combustion results in high hydrocarbon emissions and low fuel economy, problems that can be alleviated by injecting fuel into the combustion cylinders sooner.

In the fuel injector shown in FIG. 1 (prior art), advanced timing is achieved by introducing timing fluid into a timing chamber 17, thereby producing a height of fluid which lengthens the link between rocker arm 7 and injector plunger 13. As a result of this lengthened linkage, injector plunger 13 reaches its bottom-most position at an earlier point in the rotation of cam shaft 1. Accordingly, fuel injection occurs at a point in the combustion cycle when the piston of the engine is still moving upward, and while the combustion chamber size is still decreasing. This advancement of injection produces combustion at higher pressures than normal timing because during normal timing injection occurs at a point close to the top dead center position of the piston, and most combustion takes place while the piston is moving downward to increase the combustion chamber size.

Whether and how much timing fluid will be supplied to the timing chamber 17 of the tappet is a function of the pressure of the timing fluid. When the pressure of the timing fluid supply is insufficient to overcome the closure force of check valve 18 in passageway 19, no timing fluid is admitted to chamber 17. Furthermore, the extent to which the pressure of the timing fluid supply exceeds that necessary to open the check valve 18 determines how much timing fluid will actually enter chamber 17. Thus, because timing chamber 17 can be filled during only a limited portion of the cycle of cam shaft 1, if adequate supply pressure is not maintained, even if check valve 18 opens, a proper timing advance will not be obtained. However, due to temperature effects upon the viscosity of the timing fluid, especially the lubricant normally used as a timing fluid, sufficient pressure to properly fill the time control tappets has been very difficult to achieve under all operating conditions. The injector which is illustrated in FIG. 1 is disclosed in U.S. Pat. No. 4,249,499 which issued on Feb. 10, 1981 to Perr.

In order to address some of the concerns expressed herein, work has been done on a flow controlling system having a viscosity sensitive arrangement for producing a simulated fluid pressure. A representative illustration of such work is contained in FIG. 2 (prior art). This simulated pressure varies in correspondence with a fluid pressure at a predetermined portion of a fluid flow circuit on the basis of the viscosity of the fluid flowing through the circuit. The flow controlling system includes a pressure regulating means, that is responsive to changes in the simulated pressure, for maintaining a predetermined pressure at that predetermined portion of the fluid flow circuit. The details of the FIG. 2 prior art illustration are set forth in U.S. Pat. No. 5,024,200 which issued on Jun. 18, 1991 to Free, et al. U.S. Pat. No. 5,024,200 is hereby expressly incorporated by reference for its general background and description of the FIG. 2 system.

The flow controlling system of FIG. 2 is utilized in an engine timing control tappet system of the type having at least one expansible tappet for controlling timing of a fuel injector using oil that is supplied by a pump to an engine lubrication circuit.

One of the concerns of the FIG. 2 arrangement which is to be noted is its performance at warm oil conditions. Although it is desired to maintain or retain the original switch point during warm oil operation, the FIG. 2 arrangement and in particular the systems disclosed in U.S. Pat. No. 5,024,200 have the "penalty" of an increased switch point under warm oil conditions.

In the FIG. 2 arrangement, control valve 28 determines whether or not oil from the engine lubrication circuit is allowed to flow to check valve 18 in FIG. 1. A simplified schematic illustration of the flow logic associated with the valve 28 in U.S. Pat. No. 5,204,200 is provided by FIG. 3 (prior art). A schematic illustration of the hydromechanical control valve 28 which is arranged as a spool valve is provided by FIG. 4 (prior art).

Comparing the present invention to the referenced U.S. Pat. No. 5,024,200, the main improvement is the addition of a temperature sensitive alteration of the injection timing logic. While U.S. Pat. No. 5,024,200 described the use of a viscosity sensitive feature in connection with the supply oil pressure, the present invention introduces a pressure divider which adds a viscosity sensing function to the injection timing decision of the control valve (valve 28). In order to help explain aspects of the injection timing logic based on the present invention, FIGS. 8 and 9 are provided. FIG. 8 shows the switch point between advance and retard as a function of engine oil temperature and FIG. 9 shows the resulting engine operational envelope for injection timing control, depicting the difference between temperature extremes.

In addition to U.S. Pat. No. 5,024,200 which issued Jun. 18, 1991 to Free, et al., there are several other patents which have issued over the years relating to oil viscosity measuring and timing control systems and devices. The following patent references are believed to be representative of these earlier systems and devices:

| U.S. Pat. No. | Patentee | Date Issued |
|---|---|---|
| 4,249,499 | Perr | Feb. 10, 1981 |
| 1,863,090 | Albersheim et al. | June 14, 1932 |
| 2,050,242 | Booth | Aug. 11, 1936 |
| 2,194,605 | Mapel | Mar. 26, 1940 |
| 2,035,951 | Eckstein | Mar. 31, 1936 |
| 3,938,369 | de Bok | Feb. 17, 1976 |
| 2,051,026 | Booth | Aug. 18, 1936 |
| 3,204,623 | Isley et al. | Sept. 7, 1965 |
| 3,170,503 | Isley et al. | Feb. 23, 1965 |
| 4,493,302 | Kawamura | Jan. 15, 1985 |
| 4,889,092 | Bostwick | Dec. 26, 1989 |

-continued

| U.S. Pat. No. | Patentee | Date Issued |
|---|---|---|
| 5,181,494 | Ausman et al. | Jan. 26, 1993 |

SUMMARY OF THE INVENTION

A viscosity sensitive, pressure divider device for use as part of an engine timing control tappet system according to one embodiment of the present invention comprises an inlet chamber having an inlet aperture arranged in flow communication with a block oil pressure supply and an exit aperture; a divider chamber having an inlet aperture, a pressure-assist outlet aperture arranged in flow communication with a hydromechanical control valve and a return outlet aperture arranged in flow communication with an oil sump; an exit chamber having an inlet aperture and an exit aperture; a first connecting conduit having a first length and being disposed in flow communication with and between the exit aperture of the inlet chamber and the inlet aperture of the divider chamber and a second connecting conduit having a second length and being disposed in flow communication with and between the outlet aperture of the divider chamber and the inlet aperture of the exit chamber, wherein the first and second conduit lengths are different such that depending on the viscosity of the fluid flowing therethrough, a controlling pressure is created in the divider chamber, this controlling pressure being present at the pressure-assist outlet aperture of the divider chamber.

One object of the present invention is to provide an improved viscosity sensitive auxiliary circuit for a hydromechanical control valve.

Related objects and advantages of the present invention will be apparent from the following description.

DESCRIPTION OF THE PREFERRED EMBODIMENT

Figure 1:
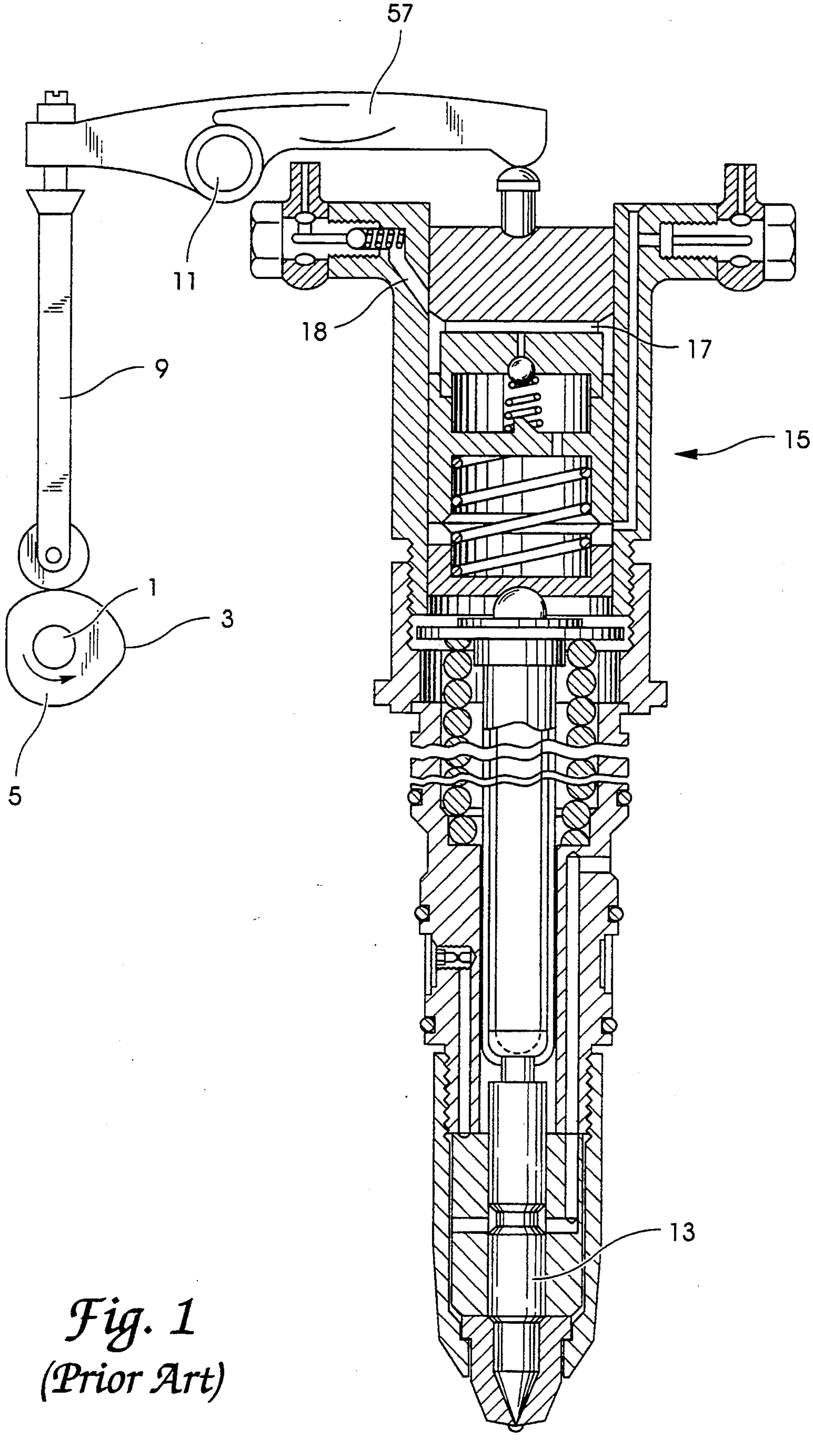
Fig. 1 (Prior Art)
FIG. 1 is a front elevational view in full section of a prior art fuel injector arrangement with an expansible tappet.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIGS. 1 through 4, there are illustrated structural arrangements, circuits and embodiments which are represented to be "prior art" to the present invention. As set forth and described to some extent in the "Background", FIG. 1 depicts an injector of the type generally contemplated for use with the present invention. The fuel injector shown in FIG. 1 includes a cam shaft 1 carrying cam lobes 3 and 5 for operating a rocker arm 7 via a link 9. Rotation of cam shaft 1 causes rocker arm 7 to rotate about shaft 11 to reciprocate injector plunger 13 via the link 9 and timing control tappet 15.

As previously mentioned, advanced timing is achieved by introducing timing fluid into timing chamber 17, thereby producing a height of fluid which lengthens the link between rocker arm 7 and injector plunger 13. As a result of this lengthened linkage, injector plunger 13 reaches its bottom-most position at an earlier point in the rotation of cam shaft 1. Whether and how much timing fluid will be supplied to the timing chamber 17 of the tappet is a function of the pressure of the timing fluid. When the pressure of the timing fluid supply is insufficient to overcome the closure force of check valve 18 in passageway 19, no timing fluid is admitted to chamber 17. Furthermore, the extent to which the pressure of the timing fluid supply exceeds that necessary to open the check valve 18 determines how much timing fluid will actually enter chamber 17.

Figure 2:
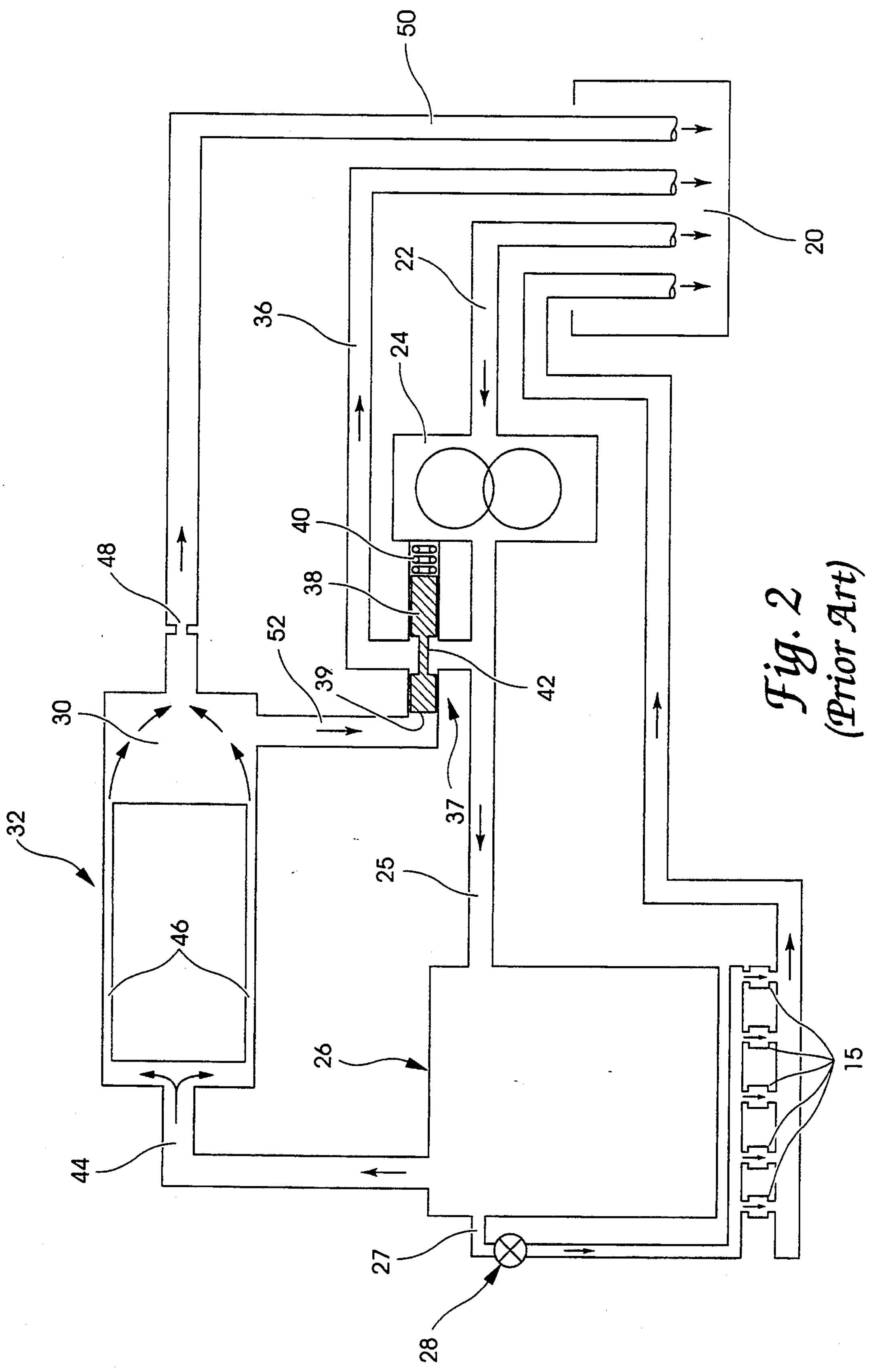
Fig. 2 (Prior Art)
FIG. 2 is a schematic depiction of a prior art engine timing tappet control system.

With regard to FIG. 2, a schematic depiction of the engine timing tappet control system in accordance with U.S. Pat. No. 5,024,200 is illustrated. In this particular system, oil is pumped from an oil pan 20 through a conduit 22 by a gear pump 24. Oil leaving the gear pump flows via conduit 25 to lubricate and cool the engine by way of drillings (not shown) within engine block 26. Additionally, an oil rifle 27 feeds timing control tappets 15. The timing control tappets 15 are connected in parallel with the engine block drillings, and flow to the tappets is controlled by control valve 28 which is in either a closed position for normal timing or in an open position for advanced timing.

As described in U.S. Pat. No. 5,024,200 at low temperatures, the high viscosity of cold lubrication oil results in a very large pressure drop across the system. While one way to remedy this problem would be to provide a constant pressure at the tappets by sensing the pressure of the lubrication oil there, rather than at the engine block drillings, the tappets are relatively inaccessible and they only see pressure when valve 28 is open. As a result, a reliable pressure reading cannot be obtained at the tappets. For this reason, the changes in pressure experienced by the tappet due to temperature related variations in the viscosity of the lubrication oil is simulated in a pressure sensing chamber 30 of a viscosity sensitive means 32.

The pressure of flow through conduit 25 is regulated by the diversion of some of the flow output from pump 24 into a bypass loop 36. In the embodiment of the '200 patent, the diversion of flow into bypass loop 36 is regulated by a pressure regulator 37 having a pressure regulating plunger 38. In response to pressurized oil contacting the left face 39 of the pressure regulating plunger 38, it moves to the right against the force of a biasing spring 40. In response to a low pressure contacting left face 39 of pressure regulating plunger 38, biasing spring 40 pushes the plunger to the left. Pressure regulating plunger 38 is constructed with a medial portion 42 of narrow cross-section which permits flow from gear pump 24 to enter bypass loop 36.

In order to simulate the tappet pressure, an oil rifle or supply connection 44 provides a flow of lubrication oil at regulator output pressure (the pressure supplied to the engine by conduit 25) to the viscosity sensitive means 32. The oil from this line is passed through a viscosity orifice 46 to pressure chamber 30, from which it flows via an exit orifice 48 to the oil pan 20 via a drain connection 50.

A regulator connection 52 communicates the pressure in pressure chamber 30 with the face 39 of the pressure regulating plunger 38 via the port normally used to connect rifle 44 to regulator 37 in earlier systems. The instantaneous pressure produced in pressure sensing chamber 30 is a result of the design of viscosity orifice 46 and exit orifice 48 with regulator valve 37 reacting immediately to bring the pressure in chamber 30 back to the desired value.

Figure 3:
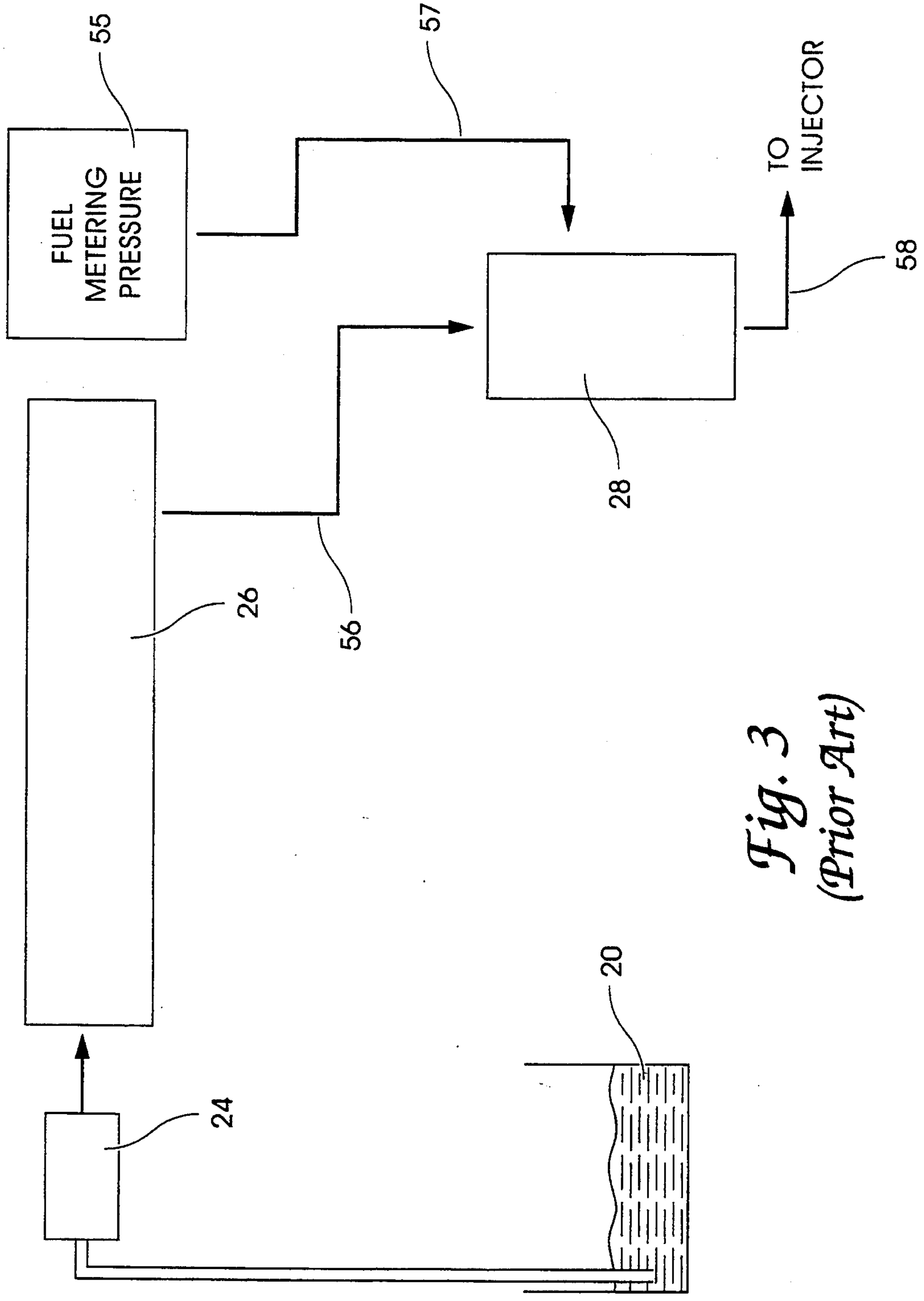
Fig. 3 (Prior Art)
FIG. 3 is a schematic depiction of a prior art control valve circuit.

Referring to FIG. 3, there is a simplified schematic illustration of the hydromechanical control valve (valve 28) circuit indicating the various flow connections and factors influencing control valve 28. Those portions included in this schematic depiction include oil sump 20, gear pump 24, engine block 26, which is in fact the source of block oil pressure supply, and control valve 28, Also schematically depicted in FIG. 3 is a functional block 55 identified as fuel metering pressure. The flow connections indicate that oil from oil sump 20 is drawn out by pump 24 and delivered to the engine block 26. The supply of oil within the engine block is flow coupled to control valve 28 by means of conduit 56. The source of fuel metering pressure indicated by block 55 is flow coupled by conduit 57 to control valve 28. Depending upon those factors and forces influencing the operation of control valve 28, when it is open, oil under pressure will be delivered to the injector (tappets) via conduit 58.

Figure 4:
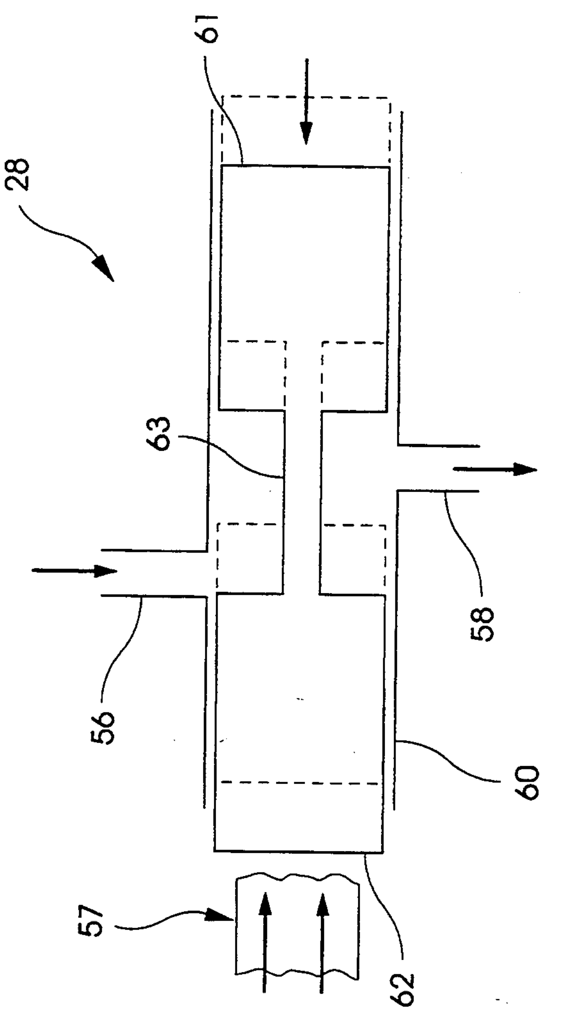
Fig. 4 (Prior Art)
FIG. 4 is a schematic depiction of a prior art hydromechanical control valve.

With reference to FIG. 4, control valve 28 as depicted in FIG. 3 is illustrated in greater detail. The schematic illustration of FIG. 4 shows control valve 28 as a spool valve which controls the flow of oil from the engine block 26 via conduit 56 to the injector (tappets) via conduit 58. The spool valve per se is disposed within a hydromechanical valve body 60 which provides the connections for conduits 56 and 58.

Looking at the left and right ends of the illustrated spool valve, there is a return spring force against the right hand face 61 of spool valve 28. At the opposite side or opposite end of spool valve 28 is the fuel metering pressure acting against spool valve face 62. Although schematically illustrated by pressure arrows, the fuel metering pressure acting on face 62 is in fact provided by way of conduit 57 (see FIG. 3). The return spring force relative to the fuel metering pressure force, which are noted to be acting against or opposite to each other, will determine the position of the medial portion 63 relative to the inlet (conduit 56) and outlet (conduit 58) locations. The broken line position for spool valve 28 indicates the position of the valve when the injector timing is in a retard mode such that oil pressure from the engine block is not allowed to pass to the injector (tappets). In the solid line position for valve 28, oil is allowed to pass and this position denotes when the valve is in a timing advance mode.

Consistent with the schematic depictions of FIGS. 3 and 4, the control valve 28 is designed to sense the fuel metering pressure and determine whether or not to send oil to the injector hydraulic tappets. The control valve function in this particular arrangement is independent of operating temperature and under certain conditions may lead to the undesired white smoke.

Due to the fact that the spring cavity which provides the return spring force against face 61 is vented to the engine crankcase, the return force from the spring is the only force counteracting the fuel metering pressure on the opposite end (face 62) of the spool valve 28. The fuel metering pressure which causes the spool valve to move is the so termed "switch point". In this prior art design the switch point is constant and independent of operational temperature.

Figure 5:
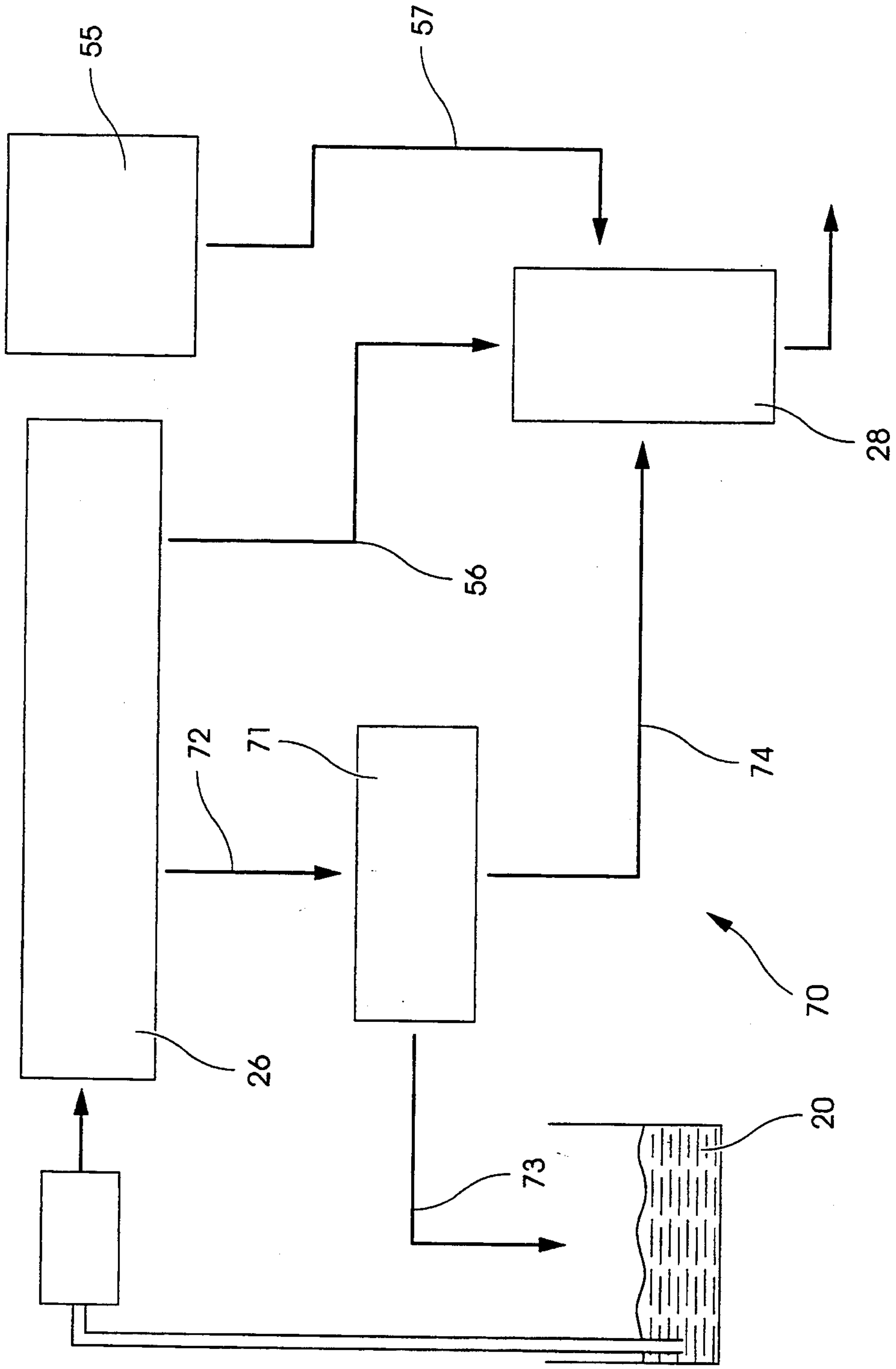
FIG. 5 is a schematic depiction of a control valve circuit incorporating a viscosity sensitive auxiliary circuit and pressure divider according to a typical embodiment of the present invention.

Referring now to FIG. 5 the viscosity sensitive auxiliary circuit of the present invention is illustrated. This auxiliary circuit 70 includes a pressure divider 71 which is arranged as illustrated in FIG. 5 so as to be in flow communication with the block oil pressure supply 26, the oil sump 20 and the control valve 28. Conduits 72, 73 and 74 are used to make these flow communication connections. The oil pressure from the engine is supplied to the hydromechanical valve 28 via conduit 56. Depending, in part, upon the engine fuel metering pressure which the control valve see from functional block 55 via conduit 57 a flow logic decision occurs. The decision is whether or not to send oil to the hydraulic tappets in the injectors. The pressure divider 71 receives oil pressure as an input source discharging the oil back to the oil sump 20. Depending upon the oil temperature and viscosity of the supply oil, there may be an adequate output pressure from the pressure divider via conduit 74 (the assist pressure) so as to also influence the function of control valve 28. The remainder of the control circuit 70 in FIG. 5 is virtually the same as that illustrated in FIG. 3.

Figure 6:
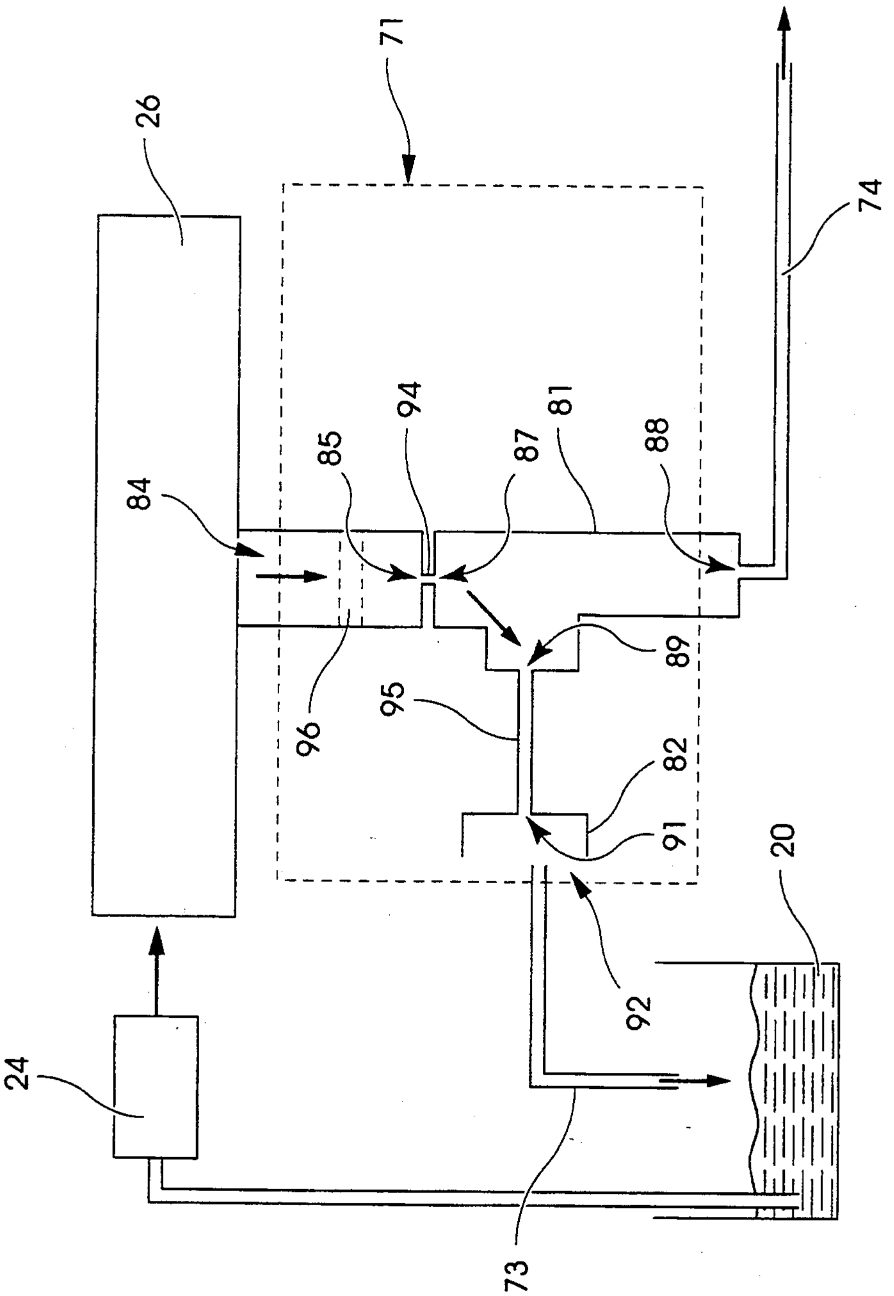
FIG. 6 is a schematic depiction of the pressure divider portion of the FIG. 5 control valve circuit.

Referring now to FIG. 6, the internal details of pressure divider 71 are schematically depicted. Pressure divider 71 includes an inlet chamber 80, a divider chamber 81 and an exit chamber 82. The inlet chamber 80 includes an inlet aperture 84 which is in flow communication with the block oil pressure supply 26. At the opposite end of the inlet chamber there is an exit aperture 85. The divider chamber 81 includes an inlet aperture 87, a pressure-assist outlet 88 and a return outlet aperture 89. The pressure-assist outlet aperture 88 is in flow communication with the control valve 28 via conduit 74.

Exit chamber 82 includes an inlet aperture 91 and an exit aperture 92. Exit aperture 92 is in flow communication with oil sump 20 via conduit 73. A first connecting conduit 94 is disposed between outlet aperture 85 and inlet aperture 87. A second connecting conduit 95 is disposed in flow communication between return outlet aperture 89 and inlet aperture 91.

An oil filtration device 96 is disposed within inlet chamber 80 in order to prevent fouling of the first connecting conduit as well to prevent fouling of either of the corresponding outlet aperture or inlet aperture.

The first and second connecting conduits each have a similar diameter size though, as illustrated, are substantially different in overall length between their corresponding inlet and exit apertures. The length between apertures of the first connecting conduit 94 is substantially less than the length of the second connecting conduit 95 between its corresponding inlet and outlet apertures. In operation, there is an intermediate pressure which is created within divider chamber 81 between the first and second connecting conduits. This intermediate pressure is sometimes referred to as the controlling pressure or also known as the assist pressure which is communicated to the hydromechanical control valve 28 via conduit 74. The assist pressure is influenced in part by the length of the two connecting conduits which are arranged in series and the viscosity of the oil. Any differential pressure drop through those conduits is influenced by the viscosity of the oil and the relative conduit lengths. Since the first connecting conduit due to its shorter length is less viscosity sensitive than is the second connecting conduit due to its greater length, there is a relative pressure drop which occurs within divider chamber 81. The net effect is that under cold conditions, there is an assist pressure within chamber 81 and at outlet 88 which is in flow communication with control valve 28 via conduit 74. Depending on the oil temperature and viscosity the assist pressure may reach a level where it is significant enough to provide altered control of the hydromechanical valve 28 (see FIG. 7). Under warm oil operating conditions the assist pressure will be minimal and likely insignificant such that it would not influence the operation of valve 28. During hot oil and stable conditions the assist pressure is very low and thus is unable to influence the functioning of the hydromechanical valve 28 which exists in one of two. ON-OFF states (i.e., open or closed).

Figure 7:
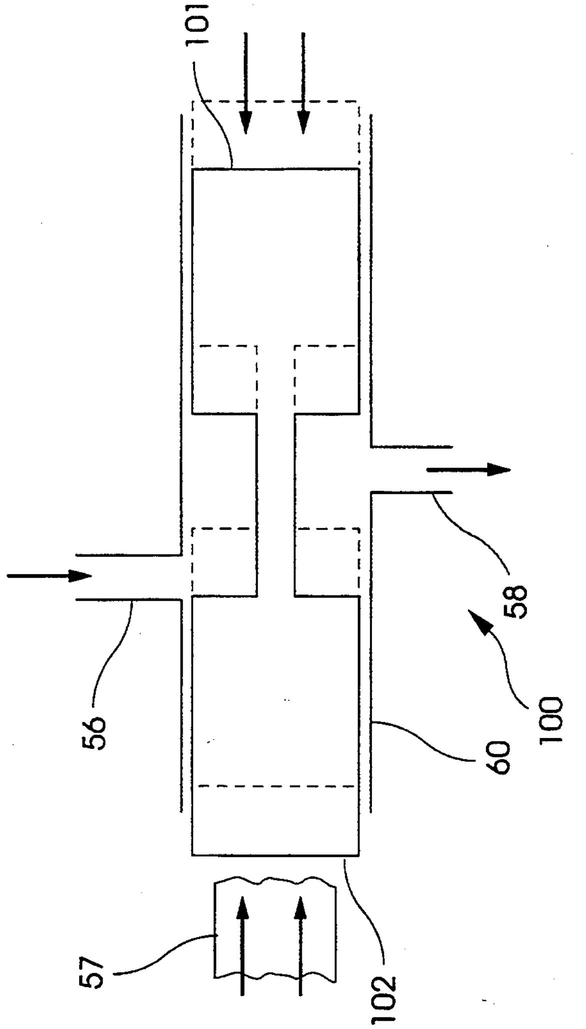
FIG. 7 is a diagrammatic illustration of the FIG. 5 control valve circuit, as influenced by the pressure divider circuit according to the present invention.

Referring to FIG. 7 the style of the hydromechanical control valve which was illustrated in FIG. 4 is virtually duplicated with one exception. The hydromechanical control valve 100 of FIG. 7 is modified such that the right hand face 101 not only receives the return spring force as was previously provided in the FIG. 4 embodiment, but additionally receives, or may receive, an additional force which is the result of any assist pressure which may be generated within divider chamber 81 and ultimately communicated to the hydromechanical control valve 100 via conduit 74. Consequently, hydromechanical control valve 28 and hydromechanical control valve 100 should be regarded as identical to each other with the lone exception of the connection of conduit 74 and the ability to apply an assist pressure to valve face 101 depending on the performance of the viscosity sensitive, pressure divider circuit 71 as illustrated in FIG. 6.

With continued reference to FIG. 7, the force balance for the spool valve is dominated by the fuel metering pressure against valve face 102 (via conduit 57) and offset by the return spring force in combination with the force of the assist pressure acting against valve face 101. This assist pressure across the spool end replaces what was previously a zero pressure input due to the fact that the spring cavity was vented to the engine crankcase. The addition of the assist pressure effectively increases the fuel metering pressure required in order to move the spool valve to a closed condition in order to retard timing. A higher fuel pressure would correspond, for example, to an increased engine load.

When in an advance timing mode, the spool valve is open and permits the passage of oil to the injector tappets. The fuel pressure at which the spool valve reaches the threshold for motion is called the "switch point" as that term is commonly used and as that term is used in this specification. When in the retard mode, the spool valve shuts off the oil supply as illustrated in the broken line position for the spool valve of FIG. 7.

Figure 8:
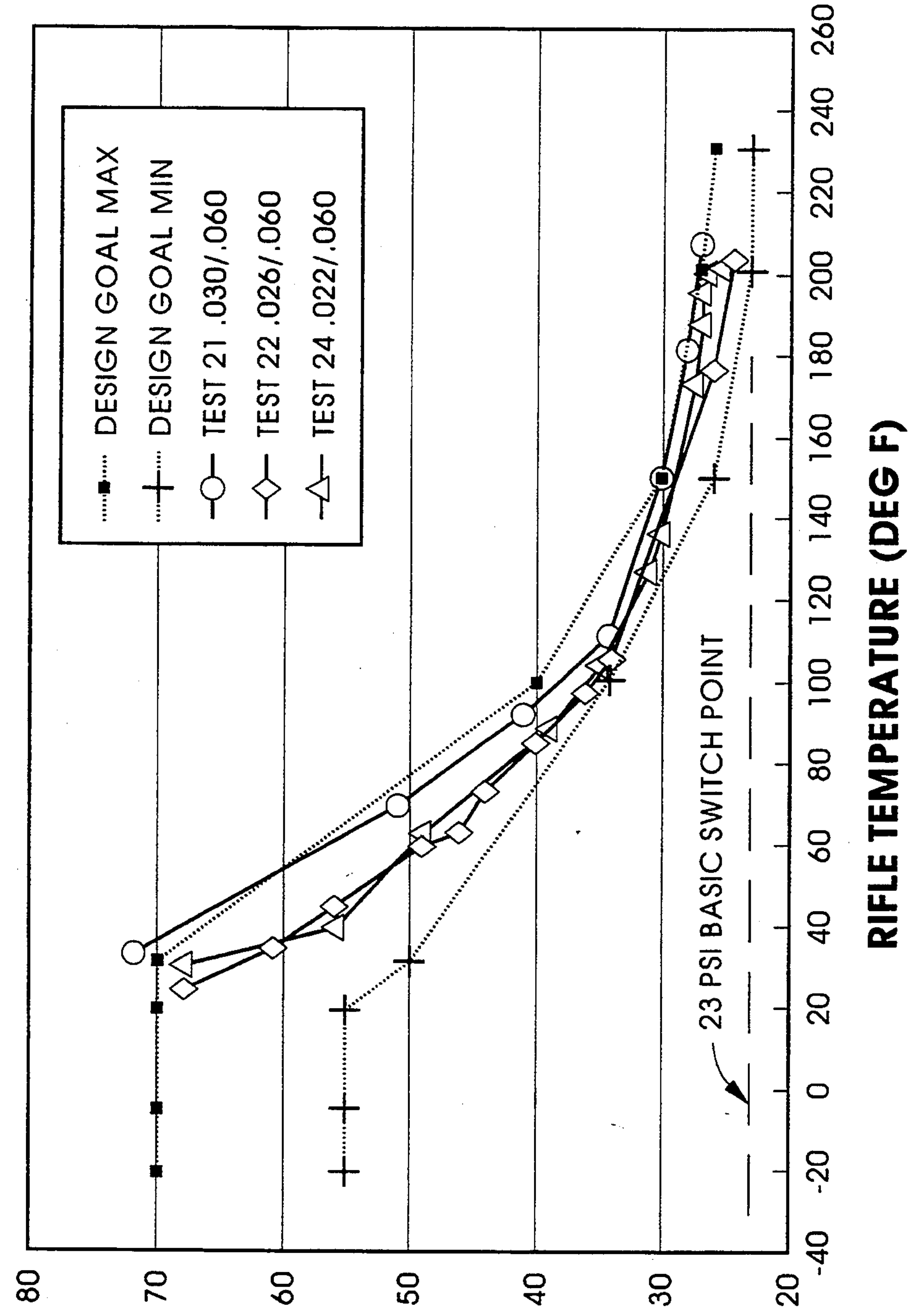
FIG. 8 is a diagrammatic illustration in chart form indicating the switch point between advance and retard as a function of engine oil temperature.

Referring now to FIG. 8 this diagrammatical illustration in the form of a chart or graph shows the switch point between advance and retard timing modes as a function of engine oil temperature. The original function is shown as a dashed line, that of a constant fuel pressure of 23 psig to switch from advance to retard or retard to advance, independently of engine oil temperature. The net result is that this is too low for ideal cold ambient operation causing excess white smoke when cold. The altered function achieved with the addition of the viscosity sensitive auxiliary circuit according to the present invention is depicted in several possible candidate orifice combinations whereby the desired elevation of cold ambient switch point is achieved through means external to the hydromechanical control valve. This altered function could also be achieved through means internal to the hydromechanical control valve, but at a disadvantage to usefulness to the aftermarket, requiring replacement of the original control valve. The present design offers flexibility in selection of inlet and outlet orifice combinations in order to achieve the desired cold and hot operation parameters.

The criteria shown on the FIG. 8 chart for maximum and minimum desired fuel pressures are based on test and analysis experience. On the one hand a maximum acceptable fuel pressure for advance is determined by cylinder pressure constraints of the engine structure. The minimum acceptable fuel pressure for retard is determined by engine combustion considerations, mainly the symptom of unburned hydrocarbons and white smoke. There are three different test lines charted in FIG. 8 for different parameters though each indicates that as the oil temperature increases the switch pressure decreases.

Figure 9:
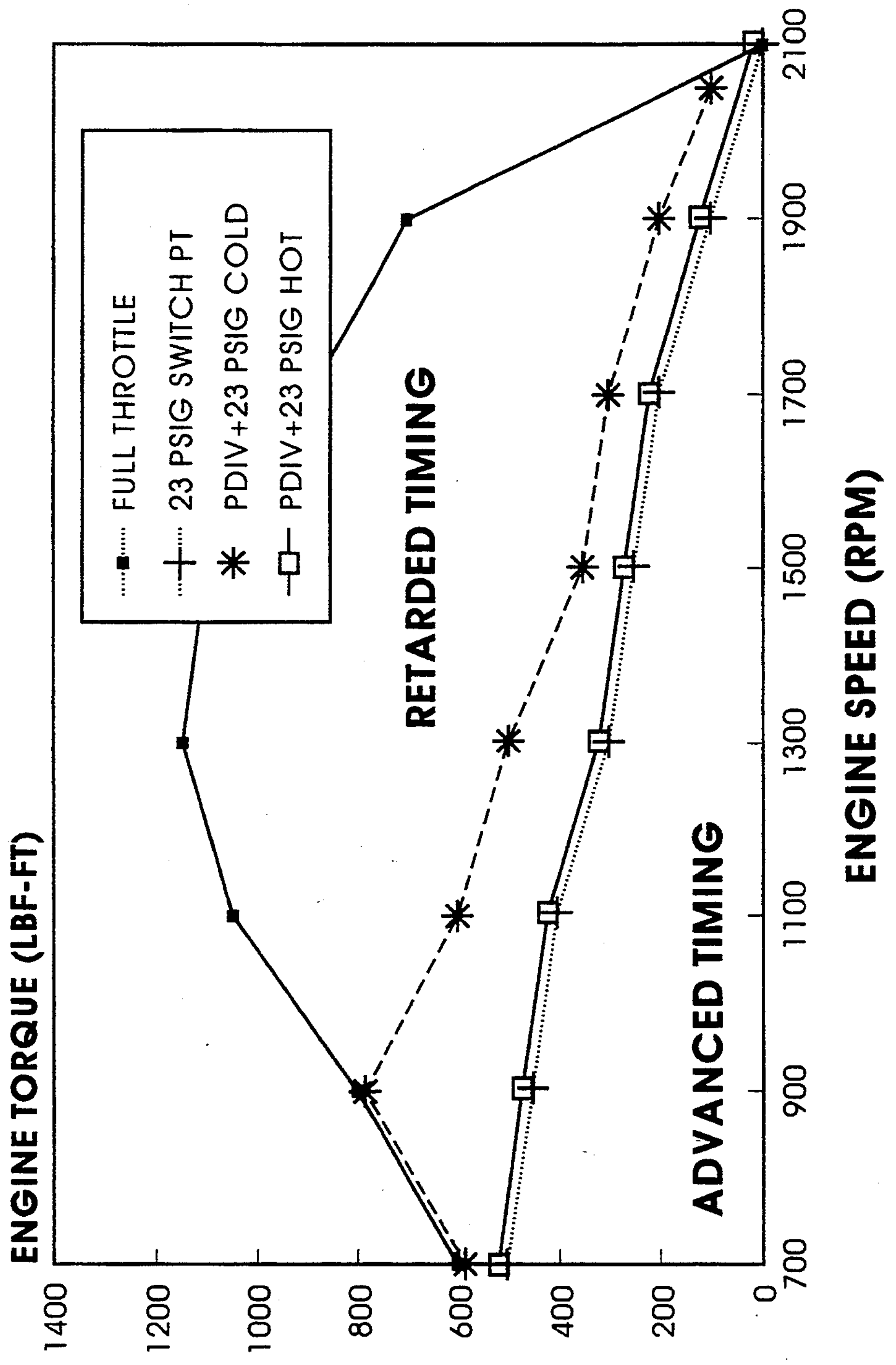
FIG. 9 is a diagrammatic illustration in chart form of the engine operational envelope for injection timing control depicting the difference between temperature extremes.

Referring now to FIG. 9 there is illustrated in diagrammatic form by way of the chart or graph the resulting engine operational envelope for injection timing control, depicting the difference between temperature extremes. The X axis of this graph represents engine speed and the Y axis of the graph is engine torque. The area which is labeled as "retarded timing" is the zone under which the control system sees high fuel pressure and causes the control valve to switch oil "off" to the tappets and switches the engine to retard injection timing. The area labeled "advanced timing" is the lower load zone where the low fuel pressure causes the control valve to switch oil "on" to the tappets, and the engine to advance injection timing. The diagonal lines which are illustrated in this graph running through the diagram depict the various control schemes and environment and their effect on transition of injection timing. For example, the base system uses a constant 23 psig switch point and the dotted line shows the loads where timing transition occurs. The PDIV curves show the effect of the oil temperature on the switch point as the pressure divider alters the switch point function and creates a larger zone of operation when the engine is cold. Under warm conditions, the inherent hydromechanical control valve functionality provides a desirable control function. Under cold operation, additional engine load is desirable before shifting to the retard mode.

By the teachings of the present invention there is provided an opportunity for improvement in the control strategy which offers design flexibility in selecting the appropriate control valve switch point behavior to match the needs of the engine design.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An engine timing control tappet system of the type having at least one expansible tappet for controlling timing of a fuel injector using oil that is supplied by a pump to an engine lubrication circuit, wherein said system includes viscosity sensitive means that is coupled to the engine lubrication circuit for producing a simulated pressure which varies in correspondence with the effect of changes in the viscosity of oil received from the engine lubrication circuit and pressure regulating means responsive to changes in said simulated pressure for adjusting the pressure of oil supplied through said engine lubrication system to said tappets from said pump, wherein said viscosity sensitive means is coupled to the engine lubrication circuit by an oil rifle connection, and comprises a viscosity orifice, a pressure chamber, a regulator connection, and an exit orifice; said viscosity orifice being connected between the rifle connection and the pressure chamber and having a flow through length and a cross-sectional area that produces a pressure drop from an upstream side to a downstream side thereof that is sensitive to changes in viscosity of oil passing therethrough; wherein said exit orifice has, in comparison to said viscosity orifice, a relatively short flow-through length and relatively small sensitivity to the viscosity of oil passing therethrough, said exit orifice being connected to a downstream side of the pressure chamber as a means for controlling the quantity of flow through said viscosity orifice; and wherein said regulator connection communicates said pressure regulating means with said pressure chamber, wherein the improvement comprising:

a control valve disposed between said engine lubrication circuit and said one expansible tappet; and a pressure divider arrangement positioned within said engine timing control tappet system and arranged in flow communication between said engine lubrication circuit and said control valve for influencing the switch point of said control valve.

2. The engine timing control tappet system of claim 1 wherein said pressure divider arrangement includes an inlet chamber, a divider chamber and an outlet chamber which are serially connected in flow communication.

3. The engine timing control tappet system of claim 2 wherein said inlet chamber is disposed in flow communication with said divider chamber by means of a first connecting conduit and wherein said divider chamber is in flow communication with said exit chamber by means of a second connecting conduit.

4. The engine timing control tappet system of claim 3 wherein said first connecting conduit and said second connecting conduit each have a similar diameter size and are of different lengths, the length of said second connecting conduit being greater than the length of said first connecting conduit.

5. The engine timing control tappet system of claim 4 wherein said control valve is configured as a spool valve whose switch point is influenced by means of a pressure balance.

6. The engine timing control tappet system of claim 1 wherein said control valve is arranged as a spool valve whose switch point is determined by a pressure balance.

7. The engine timing control tappet system of claim 6 wherein said pressure divider includes a first flow orifice and in flow communication therewith a second flow orifice, said second flow orifice having a greater viscosity sensitivity than said first flow orifice such that a controlling pressure is created within said pressure divider arrangement.

8. An engine timing control tappet system of the type having at least one expansible tappet for controlling timing of a fuel injector using oil that is supplied by a pump to an engine lubrication circuit, wherein said system includes viscosity sensitive means that is coupled to the engine lubricating circuit for producing a simulated pressure which varies in correspondence with the effect of changes in the viscosity of oil received from the engine lubrication circuit and further comprising pressure regulating means fluidically connected to said viscosity sensitive means and hydraulically responsive to changes in said simulated pressure for adjusting the pressure of oil supplied through said engine lubrication system to said tappets from said pump, wherein the improvement comprising:

a control valve disposed between said engine lubrication circuit and said one expansible tappet; and a pressure assist device cooperatively arranged with said control valve for introducing an influencing pressure signal to said control valve.

9. The engine timing control tappet system of claim 8 wherein said pressure assist device includes an inlet chamber, a divider chamber and an outlet chamber which are serially connected in flow communication.

10. The engine timing control tappet system of claim 9 wherein said inlet chamber is disposed in flow communication with said divider chamber by means of a first connecting conduit and wherein said divider chamber is in flow communication with said exit chamber by means of a second connecting conduit.

11. The engine timing control tappet system of claim 10 wherein said first connecting conduit and said second connecting conduit each have a similar diameter size and are of different lengths, the length of said second connecting conduit being greater than the length of said first connecting conduit.

12. The engine timing control tappet system of claim 11 wherein said control valve is configured as a spool valve whose switch point is influenced by means of a pressure balance.

13. The engine timing control tappet system of claim 8 wherein said control valve is arranged as a spool valve whose switch point is determined by a pressure balance.

14. The engine timing control tappet system of claim 13 wherein said pressure assist device includes a first flow orifice and in flow communication therewith a second flow orifice, said second flow orifice having a greater viscosity sensitivity than said first flow orifice such that a controlling pressure is created within said pressure assist device.

15. A viscosity sensitive, pressure divider device for use as part of an engine timing control tappet system which system includes a block oil pressure supply, a hydromechanical control valve arid an oil sump, said pressure divider device comprising:

an inlet chamber having an inlet aperture and an exit aperture, said inlet aperture being arranged in flow communication with said block oil pressure supply;

a divider chamber having an inlet aperture, a pressure-assist outlet aperture arranged in flow communication with said hydromechanical control valve and a return outlet aperture;

an exit chamber having an inlet aperture and an exit aperture arranged in flow communication with said oil sump;

a first connecting conduit of a first length disposed in flow communication with and between the exit aperture of said inlet chamber and the inlet aperture of said divider chamber; and a second connecting conduit of a second length disposed in flow communication with and between the outlet aperture of said divider chamber and inlet aperture of said exit chamber, wherein said first and second conduit lengths are different such that depending on the viscosity of the fluid flowing therethrough, a controlling pressure is created in said divider chamber, said controlling pressure being present at the pressure-assist outlet of said divider chamber.

16. The viscosity sensitive, pressure divider device of claim 15 wherein the inside diameter of said first connecting conduit is substantially the same as the inside diameter size of said second connecting conduit and said second connecting conduit having a length which is greater than the length of said first connecting conduit.

* * * * *

UNITED STATES PATENT AND TRADEMARK OFFICE
CERTIFICATE OF CORRECTION

PATENT NO. : 5,411,003

DATED : May 2, 1995

INVENTOR(S) : Walter W. Eberhard, et al.

It is certified that error appears in the above-identified patent and that said Letters Patent is hereby corrected as shown below:

In column 5, at line 36, replace "28," with --28. --.

In column 11, at line 1, replace "arid" with --and--.

Signed and Sealed this

Twenty-ninth Day of August, 1995

Attest:

BRUCE LEHMAN

Attesting Officer

Commissioner of Patents and Trademarks